(12) United States Patent
O et al.

(10) Patent No.: US 6,350,835 B1
(45) Date of Patent: Feb. 26, 2002

(54) EMULSIONS OF PEROXYESTERS

(75) Inventors: Boen Ho O, Utrecht; Hans Westmijze, Bathmen, both of (NL)

(73) Assignee: Akzo Nobel NV (NL)

( * ) Notice: Subject to any disclaimer, the term of this patent is extended or adjusted under 35 U.S.C. 154(b) by 0 days.

(21) Appl. No.: 09/489,238

(22) Filed: Jan. 21, 2000

Related U.S. Application Data

(63) Continuation of application No. PCT/EP98/04015, filed on Jun. 16, 1998.

(30) Foreign Application Priority Data

Jul. 24, 1997 (EP) .............................. 97202307

(51) Int. Cl.$^7$ .............................. C08F 4/34; B01J 31/02
(52) U.S. Cl. .................. 526/202; 526/227; 524/459; 516/74; 516/76; 252/182.28; 252/182.29; 502/160
(58) Field of Search .............. 516/74, 76; 524/459; 526/202; 252/182.28, 182.29; 502/150, 159, 160, 172

(56) References Cited

U.S. PATENT DOCUMENTS

| | | | |
|---|---|---|---|
| 3,988,261 A | 10/1976 | Barter et al. .......... 252/186.26 |
| 4,345,056 A | * 8/1982 | Thyret et al. .............. 526/202 |
| 4,499,250 A | * 2/1985 | Lundin et al. .............. 526/209 |
| 4,705,888 A | * 11/1987 | Meijer et al. .............. 526/227 |
| 4,950,422 A | 8/1990 | Torenbeek et al. .......... 526/200 |
| 5,369,197 A | * 11/1994 | Torenbeek et al. .......... 502/160 |
| 5,403,804 A | * 4/1995 | Lundin et al. .............. 502/160 |
| 5,574,200 A | * 11/1996 | Lundin et al. .............. 502/160 |

FOREIGN PATENT DOCUMENTS

| | | | |
|---|---|---|---|
| EP | 32757 B1 | 3/1983 | ......... C07C/179/14 |
| GB | 2068008 | 8/1981 | ............. C08F/4/32 |
| JP | 1986-130315 | 6/1986 | |
| JP | 87-86005 | 4/1987 | |

OTHER PUBLICATIONS

Patent Abstracts of Japan, Publication No. 01249132 (Apr. 1989).

Anonymous, Research Disclosure, vol. 215 (1982), No. 21520. Month unknown.

* cited by examiner

*Primary Examiner*—Daniel S Metzmaier
(74) *Attorney, Agent, or Firm*—Richard P. Fennelly

(57) ABSTRACT

The invention relates to aqueous emulsions of peroxyesters comprising an anti-freeze agent, a polyvinyl acetate with a degree of hydrolysis between 45 and 68%, and a non-ionic surfactant with an HLB value greater than 16 selected from alkylene oxide block-copolymers, ethoxylated fatty alcohols, and ethoxylated fatty acids. The emulsions are safe, storage stable, and generally applicable.

14 Claims, No Drawings

EMULSIONS OF PEROXYESTERS

RELATED APPLICATION

This application is a continuation application of PCT/EP98/04015, filed Jun. 16, 1998, which published as PCT WO 99/05101 on Feb. 4, 1999.

BACKGROUND OF THE INVENTION

The invention relates to an aqueous emulsion of a peroxyester that is liquid at −20° C., which comprises a protective colloid, a non-ionic surfactant, and an anti-freeze agent.

Such peroxide emulsions are known from European Patent No. 32,757. According to this reference, a variety of peroxides, colloids, and surfactants can be used in emulsions that also comprise an anti-freeze agent. For the surfactants and protective colloids of choice, reference is made to U.S. Pat. No. 3,988,261, which lists many such compounds. In respect of one of the listed types of protective colloids, namely, polyvinyl acetate (PVA), it is stated that the degree of hydrolysis will influence the properties. It is suggested to use PVAs with a substantial degree of hydrolysis, e.g. 65% or more. In European Patent No. 32,757, however, only one emulsion is presented which includes a peroxyester, namely, tert-butyl peroxyneodecanoate. In this example, an ethoxylated nonylphenol is used as the surfactant, while xanthan gum is used as the protective colloid.

The protective colloids and surfactants mentioned in U.S. Pat. No. 3,988,261 generally are not suitable for the production of concentrated, storage-stable, and safe peroxyester emulsions such as are widely accepted in polymerization processes. One class of surfactant, namely, the ethoxylated nonylphenol type, is known to be detrimental to the electrical properties of polyvinyl chloride (PVC) when introduced into the polymerization process of vinyl chloride monomer (VCM). Also, it is well-known that the ethoxylated nonylphenols have environmental drawbacks. In regard to the other surfactants that are listed, it is noted that they are generally unacceptable because they typically result in very viscous peroxyester emulsions and/or emulsions that are not safe, particularly when emulsions with a high concentration of perester are produced. It was also found that most of the listed protective colloids, in combination with the suitable surfactants, are not acceptable in the formulation of peroxyesters. The protective colloids mentioned will often result in unacceptable viscosity of the peroxyester emulsion.

Hence, there is a need for concentrated peroxyester emulsions with a low viscosity that are storage-stable, safe, and generally applicable in polymerization processes, particularly those of VCM.

There are various other publications that relate to water-based peroxide dispersions. However, none of them disclose or suggest peroxyester emulsions that satisfy the above-mentioned criteria.

Japanese patent Publication No. 61-130315 (1986) suggests that peroxyester emulsions can be made using a protective colloid, a non-ionic surfactant, and an anti-freeze agent. It is taught that the non-ionic surfactant can be selected from a variety of materials, while the protective colloid must be a product with a high dissolution rate in water, such as modified celluloses and saponified polyvinyl acetates (PVAs). Preferred are PVAs with a degree of hydrolysis greater than 60 mole %. The only exemplified formulations are emulsions of peroxy-dicarbonates. Using these formulations for peroxyesters was found to result in emulsions that do not satisfy the requirements of safety, viscosity, and/or applicability.

British Patent No. 2, 068,008 discloses aqueous peroxide dispersions in which a protective colloid, such as a cellulose or a PVA, is used together with an emulsifier system with an HLB above 15. The emulsifier(s) is/are specified to be non-ionic, ethoxylated, free from cyclic internal ether bonds, and suitably selected from ethoxylated alkylphenols, ethoxylated fatty alcohols, ethoxylated fatty acids, ethoxylated glycol and glycerol fatty esters, and alkylene oxide block copolymers. Although this reference suggests using surfactants with a very high HLB value, it does not suggest to the person of ordinary skill in the art he should make a specific combination of peroxyesters, anti-freeze, PVAS, and surfactants. More specifically, peroxyesters and/or anti-freeze agents are not mentioned at all.

SUMMARY OF THE INVENTION

It has now been found that, surprisingly, improved aqueous peroxyester emulsions can be produced and applied by a proper combination of peroxyester, non-ionic surfactant, and protective colloid. The invention is characterized in that the protective colloid is a polyvinyl acetate with a degree of hydrolysis between 45 and 68% and the non-ionic surfactant has an HLB value of 16 or higher and is selected from alkylene oxide block-copolymers, ethoxylated fatty alcohols, and ethoxylated fatty acids.

DETAILED DESCRIPTION OF PREFERRED EMBODIMENTS

In this specification, the term "surfactant" refers to a surface-active chemical that is to be used in the peroxyester formulations according to the invention and that influences the interfacial surface tension between the water and the peroxyester phase. Such compounds are also known as "emulsifiers." Preferably, the aqueous peroxyester emulsion according to the invention contains only one surfactant with an HLB value of 16 or higher. More preferred are surfactants with an HLB value of 17 or higher, since such surfactants tend to result in less viscous emulsions. If so desired, a mixture of surfactants can be used. In that case, the combined surfactants should have an HLB value of 16 or higher, while it is preferred that all surfactants used have an HLB greater than 10, preferably greater than 12.5, and more preferably of 16 or higher, because surfactants with a lower HLB value can have an adverse effect on the viscosity of the final emulsion. HLB value stands for "hydrophilic-lipophilic balance" as described in "The Atlas HLB-System, a Time Saving Guide to Emulsifier Selection," published by Atlas Chemical Industries Inc., 1963. For blends of surfactants the HLB value is calculated from the weight ratio of the components, as is also mentioned in this publication.

The non-ionic surfactant or surfactants that can be used in the aqueous emulsions according to the invention are alkylene oxide block-copolymers, ethoxylated fatty alcohols, and ethoxylated fatty acids. The preferred surfactants are ethoxylated fatty alcohols and ethoxylated fatty acids with an HLB value greater than 16. Most preferred are such ethoxylated fatty alcohols. These products were found to be pre-eminently suited to make emulsions with good stability, safety, and viscosity properties at high peroxyester concentrations. The amount of the surfactant or the combination of surfactants in the final emulsion is from 0.05–5 percent by weight (% w/w). Preferably, from 0.1 to 2% w/w of surfactant is used, while an amount between 0.1 and 1% w/w is most preferred.

The protective colloid to be used in the aqueous emulsions according to the invention must be a PVA with a degree of hydrolysis between 45% and 68%. Preferably, the degree of hydrolysis is between 45% and 62.5%. Most preferred is a PVA with a degree of hydrolysis between 50% and 60%. A PVA with a degree of hydrolysis below 45% cannot be used because such a PVA is not soluble in the mixture of water and anti-freeze. A PVA with a degree of hydrolysis greater than 68% resulted in emulsions with a too high viscosity. Instead of using just one type of PVA, also a blend of two or more PVAs can be used. In that case the blend can be seen as just one PVA of which the degree of hydrolysis is the weight average degree of hydrolysis of the PVAs. Preferably, such a blend of PVAs does not comprise a PVA with a degree of hydrolysis below 45% or above 68%, for the above-mentioned reasons.

The amount of PVA used in the emulsions according to the invention will depend on the concentration and the types of peroxyester and surfactant used and the desired viscosity of the final emulsion. Typically, the amount of PVA in the final emulsion will be between 0.5 and 10% w/w. The use of these protective colloids in combination with the above-mentioned surfactants allows the production of concentrated, storage-stable, and safe peroxyester emulsions.

The anti-freeze used in the emulsions according to the invention is to be used in an amount sufficient to keep the emulsion pourable and/or pumpable at a temperature of $-20°$ C., while it is preferred that the emulsions are still fluid at temperatures of $-25°$ C. and lower. The amount of freezing point suppressant to be used will depend on the type of anti-freeze, or mixture of anti-freezes, that is used. Suitably, first a mixture of the anti-freeze and water is made which contains a sufficient amount of the anti-freeze to be pourable at the indicated temperatures. This mixture can then be used in the further process to make the emulsions. Although use can be made of most anti-freeze agents, such as salts and organic compounds, it is preferred to use organic compounds selected from methanol, ethanol, isopropanol, glycol, propanediol, and glycerol, since it is known that such compounds will have hardly any effect on polymerization processes in which peroxyester emulsions are used. Also, combinations of two or more anti-freeze agents can be used in the emulsions according to the invention.

Peroxyester emulsions are considered to be concentrated when the amount of perester therein exceeds 30% w/w. Preferably, the concentration of peroxyester in the emulsions according to the invention is greater than 40% w/w. Even more preferred are emulsions containing 45–65% w/w of peroxyester. Most preferred are emulsions where the peroxyester concentration is 50 to 60% w/w, because such emulsions will allow substantially reduced freight and handling costs in comparison with emulsions containing 40% w/w or less of peroxyester. The safety aspects of the final emulsion predominantly determine the high end of the peroxyester concentration range. More specifically, the water/anti-freeze content of the formulation should be sufficiently high to dissipate the heat of decomposition of the peroxyester.

The peroxyester emulsions according to the invention are suitable for most peroxyesters that are liquid at $-20°$ C., but are particularly relevant for peroxyesters having a recommended storage temperature of 15° C. or less. Typically, the recommended storage temperature is specified by the producer of the peroxyesters, for instance, by Akzo Nobel Chemicals B.V. in the brochure "Initiators for High Polymers" with code 10737. Peroxyesters preferably used in the aqueous emulsions according to the invention include:

α-cumyl peroxyneodecanoate;
2,4,4-trimethylpentyl-2-peroxyneodecanoate;
tert-amyl peroxyneodecanoate;
tert-butyl peroxyneodecanoate;
2,4,4-trimethylpentyl-2-peroxypivalate;
tert-amyl peroxypivalate;
tert-butyl peroxypivalate;
tert-butyl peroxyheptanoate;
2,5-bis(2-ethylhexanoylperoxy)-2,5-dimethylhexane;
tert-amyl peroxy-2-ethylhexanoate; and
tert-butyl peroxy-2-ethylhexanoate.

The emulsions according to the invention may, if so desired, comprise one or more thickeners in a concentration up to 2% by weight in order to control the viscosity of the composition. If used, the thickener preferably makes up less than 1% by weight of the emulsion. Non-limiting examples of thickeners useful in the formulation are xanthan gum, Arabic gum, and alginates.

Further to the above-mentioned compounds, the compositions according to the invention may also comprise other "standard" additives, including pH-adjusting agents such as calcium oxide or phosphate buffers, sequestering agents, and, if desired, biocides, e.g. fungicides. The concentration of these additives will depend on the desired effect and the other ingredients in the emulsion. Given the information presented here, the skilled man will have no problem selecting appropriate concentrations of the individual ingredients in the emulsions of choice.

What is meant by "storage-stable" emulsions is that the products do not freeze at storage temperatures of $-20°$ C., preferably $-25°$ C., and have an average peroxyester droplet size (d50) and a 99 percentile of the droplet size distribution (d99) which do not change by more than 20 $\mu$m during three months of storage. Preferably, the change in d50 is less than 10 $\mu$m, more preferably less than 5 $\mu$m, since changes in droplet size will influence the viscosity and further storage stability of the emulsion, while also the polymerization process can be adversely influenced when larger peroxyester droplets are introduced, for example, by an increased number of fish-eyes. It is also for this reason that the d50 of the droplet size distribution should be below 20 $\mu$m, while a d50 of less than 10 $\mu$m, particularly below 5 $\mu$m, is preferred. The particle size is determined by means of a light scattering technique, using a Malvern® Easy Sizer.

As mentioned above, it is important that the concentrated peroxyester emulsions according to the invention have a viscosity that allows easy handling and use. In practice, this means that the product should have a viscosity of less than 500 mPa.s when measured at 0° C. using an Erichsen viscometer, model 332 (0–500 mPa.s). Preferably, the Erichsen viscosity is less than 300 mPa.s, while less than 200 mpa.s is most preferred. Alternatively, suitable emulsions were found to have a viscosity below 2000 mpa.s when measured at 0° C., using a Brookfield LVT with spindle sp3 at 12 rpm. Preferably, the emulsions will have a Brookfield viscosity of less than 1500 mPa.s.

As is well-known, peroxyesters are thermally labile organic compounds. Because the decomposition of peroxyesters is exothermic, it is hazardous when the heat of decomposition cannot be dissipated, for example, by heat loss to the surrounding area. When heat build-up occurs, the decomposition reaction eventually becomes uncontrollable and potentially dangerous. To avoid such undesired situations, the peroxide is typically formulated with one or more phlegmatizing agents, such as inert organic materials, including water. Aqueous peroxide emulsions are generally considered safe products because the peroxide is dispersed in the water phase, which is well-suited to the removal of the heat of decomposing peroxide molecules, for example, by convection and/or evaporation. However, it was observed that many peroxyester emulsions according to prior art formulations suffer from the draw-back that they show phase separation upon heating, particularly at temperatures where water evaporation becomes noticeable. If so, the peroxyester separates out and forms a highly concentrated peroxyester phase the heat of decomposition of which is not dissipated. As a result, such aqueous peroxyester emulsions can be as hazardous as the neat peroxyester. One of the objects of the emulsions according to the invention therefore was to develop formulations that do not form a significant amount of a hazardous phase upon heating. More specifically, an emulsion is considered to be safe if less than 10% by volume of one or more other phases is formed or, if more than 10% by volume of phase separation were to occur, none of the phases has a peroxyester content such that the active oxygen content is greater than 1% w/w. The emulsions as described herein were evaluated for safety by keeping them, for eight hours, at a temperature which is 30° C. above the well-known self accelerating decomposition temperature (SADT) of the peroxide.

The emulsions of the invention can be produced in a conventional manner. Typically, the compounds of the emulsion are mixed and/or homogenized using well-known equipment, such as colloid mills, perl mills, pressure homogenizers, fluidizers, ultrasonic homogenizers, etc. Because many of the peroxyesters are not stable at higher temperatures, the mixing and/or homogenizing should be done below a temperature of 15° C., preferably well below the SADT.

The emulsions of the invention are preferably used in suspension or emulsion polymerization processes. However, they can also be used in other processes, such as polymer modification processes, cross-linking reactions, mass polymerization processes, and curing processes of, for example, unsaturated polyester resins. In these processes a variety of monomers and/or polymers can be reacted, including, for example, acrylates, vinyl esters, vinyl halides, vinyl ethers, vinyl aromatic compounds, such as styrene, lower alkenes, polybutadiene, methacrylate-butadiene-styrene copolymers and the like. The emulsions therefore can be used, for example, in the mass polymerization of vinyl chloride monomer (VCM). However, the emulsions are more preferably used in suspension or emulsion polymerization processes wherein at least VCM, styrene or a (meth)acrylate is reacted. Most preferred is the use of the emulsions in the suspension polymerization process of predominantly VCM. The emulsions are only usable in these processes when they do not influence the properties of the resulting polymer, or do so only to a very limited extent. In the preferred VCM polymerization process, this means that hardly any fouling is observed and the PVC particle size, porosity, fish-eye number, and electrical properties are hardly affected.

The peroxyester emulsions according to the invention and their uses are further illustrated in the following Examples.

EXAMPLES

In the Examples, the following products and abbreviations were used:

LL02=Gohsenol® LL02, a PVA from Nippon Gohsei
55-2H=Alcotex® 55-2H, a PVA from Revertex
UMR10M=Unitika® UMR10M, a PVA from Unitika
552P=Alcotex 552P (as 100% active material), a PVA from Revertex
KP08=Gohsenol KP08, a PVA from Nippon Gohsei
KH17=Gohsenol KH17, a PVA from Nippon Gohsei
M05/190=Polyviol® M05/190, a PVA from Wacker
GH20=Gohsenol GH20, a PVA from Nippon Gohsei
Berol® 08=ethoxylated stearyl alcohol from Akzo Nobel (HLB=18.7)
Myrj® 53=ethoxylated stearic acid from ICI (HLB=17.9)
Softigen® 767=ethoxylated capril/caprylic glyceride from Hüls (HLB=18.0)
Tween® 20=ethoxylated sorbitan monolaurate from ICI (HLB=16.7)
Remcopal® 20=ethoxylated lauryl alcohol from Ceca (HLB=16.0)
Ethylan® R=ethoxylated cetyl/oleyl alcohol from Akcros (HLB=15.4)

The peroxyesters as used in the Examples were, typically, of industrial grade (crude reactor products). However, also purified peroxyesters can be used to make emulsions satisfying the criteria of the emulsions according to the invention.

Examples 1–4

An aqueous emulsion of 2,4,4-trimethylpentyl-2-peroxyneodecanoate was made by adding to a cooled vessel at $-5°$ C.:

- 50 percent by weight (% w/w) of 2,4,4-trimethylpentyl-2-peroxyneodecanoate (100% active material), supplied as industrial grade Trigonox® 151 with a purity greater than 85%,
- 3.0% w/w of PVA (see Table),
- 0.3% w/w of Berol 08 (an ethoxylated fatty alcohol, HLB=18.7),
- the remainder being a 76/24 mixture of water/methanol that did not freeze at $-20°$ C. Next, the initiator was dispersed with an UltraTurrax® type S25N-25GM (4 minutes/kg of emulsion) at full power, during which the temperature of the solution/dispersion was kept 0–5° C. below the SADT of the initiator. In Example 4, the amount of Berol 08 was reduced to 0.2% w/w.

TABLE 1

| Example | 1 | 2 | 3 | 4 |
|---|---|---|---|---|
| PVA | LL02 | 55-2H | UMR10M | 552P |
| hydrolysis (%) | 45–51 | 54–57 | 62.6–67.5 | 54–57 |
| After production. | | | | |
| Erichsen (mPa · s) | 385 | 345 | border-line | 250 |
| Brookfield (mPa · s) | 790 | 610 | 1600 | 360 |
| d50/d99 (μm) | 1.1/15.4 | 0.8/2.8 | 0.7/2.0 | 0.9/2.5 |
| After 12 weeks storage | | | | |
| Erichsen (mPa · s) | 315 | 265 | 420 | no data |
| Brookfield (mPa · s) | 1970 | 460 | 1080 | no data |
| d50/d99 (μm) | 5.2/36.3 | 2.9/4.3 | 2.5/3.4 | no data |

These emulsions were all acceptable. The emulsions according to Examples 2 and 4 are preferred.

Comparative Examples A–D

Example 1 was repeated using other types of PVA, with the following result:

TABLE 2

| Comparative Example | A | B | C | D |
|---|---|---|---|---|
| PVA | KP08 | KH17 | M05/190 | GH20 |
| hydrolysis (%) | 71–75 | 78–82 | 81–84 | 87–89 |
| After production | | | | |
| Erichsen (mPa · s) | >500 | >500 | >500 | >500 |
| Brookfield (mPa · s) | 5990 | >10000 | >10000 | 3030 |
| d50/d99 (μm) | 2.1/12.8 | 2.2/15.2 | 2.0/14.2 | 1.4/6.4 |

From these Examples 1–3 and Comparative Examples A–D it follows that only a PVA with a limited degree of hydrolysis can be used in the emulsions according to the invention.

Example 5 and Comparative Example E

In the emulsion of Example 1, the 2,4,4-trimethylpentyl-2-peroxyneodecanoate was replaced by α-cumyl peroxyneodecanoate, which was supplied as industrial grade Trigonox 99 of at least 80% purity.

TABLE 3

| Example | 5 | E |
|---|---|---|
| PVA | 552P | KP08 |
| hydrolysis (%) | 54–57 | 71–75 |
| After production | | |
| Erichsen (mPa · s) | 390 | decomposed |
| Brookfield (mPa · s) | 2000 | during |
| d50/d99 (μm) | 1.9/4.4 | preparation |

These Examples confirm that stable and safe emulsions according to the invention can only be made using PVAs with a degree of hydrolysis in a specific range.

Examples 6–7

Example 5 was repeated, except that a 50:50 (by weight) mixture of Alcotex 552P (as 100% active material) and Unitika UMR10M was used as a protective colloid. Because the Alcotex contains 40% active material, 125 parts by weight of this PVA (as supplied) were combined with 50 parts by weight of the Unitika. It is noted that, for ease of reference, the amount that is used of the ingredients is presented as 100% pure materials throughout this specification. In the following Examples, the amount of PVA is, consequently, the total amount of 100% active material that was used. In Example 6 the amount of Berol 08 was reduced to 0.15% w/w.

TABLE 4

| Example | 6 | 7 |
|---|---|---|
| amount of PVAS | 1% w/w | 1.5% w/w |
| average hydrolysis (%) | 58.3–62.3 | 58.3–62.3 |
| After production | | |
| Erichsen (mPa · s) | 275 | 395 |
| Brookfield (mPa · s) | 950 | borderline |
| d50/d99 (μm) | 1.2/4.0 | 2.7/4.0 |

TABLE 4-continued

| Example | 6 | 7 |
|---|---|---|
| After 12 weeks storage | | |
| Erichsen (mPa · s) | no data | 140 |
| Brookfield (mPa · s) | no data | 750 |
| d50/d99 (μm) | no data | 5.1/11.7 |

Both emulsions were safe. From these Examples, it follows that also combinations of PVA can be used as a protective colloid in the emulsions according to the invention.

Example 8 and Comparative Examples F and G

In the emulsion of Example 1, Alcotex 552P was used as the PVA, while the Berol 08 was replaced with the surfactants according to the table, with the following results.

TABLE 5

| Example | 8 | F | G |
|---|---|---|---|
| Surfactant | Myrj 53 | Softigen 767 | Tween 20 |
| HLB value | 17.9 | 18.0 | 16.7 |
| After production | | | |
| Erichsen (mPa · s) | 440 | >500 | 495 |
| Brookfield (mPa · s) | 840 | 4260 | 3750 |
| d50/d99 (μm) | 7.1/28.2 | 25.7/92.3 | 24.4/98.9 |

The emulsion of Example 8 was safe. From these Examples it follows that ethoxylated glyceryl esters of fatty acids (such as Softigen 767) and ethoxylated sorbitan esters (such as Tween 20), although they can have the desired HLB value, cannot be used in emulsions according to the invention.

Example 9 and Comparative Examples H and I

Example 1 was repeated, using the following recipe:
50% w/w tert-butyl peroxyneodecanoate (as 100%) supplied as industrial grade Trigonox 23,
3.5% w/w of a 50:50 mixture of Alcotex 552P (as 100%) and Unitika UMR10M with an average degree of hydrolysis of 58.3–62.3%,
for Comparative Example H, 0.5% w/w of the non-ionic surfactant mentioned in the table, while in Comparative Example I, no surfactant was used, and
the remainder being a 74/26 mixture of water/methanol.

TABLE 6

| Example | 9 | H | I |
|---|---|---|---|
| Surfactant | Remcopal 20 | Ethylan R | None |
| HLB value | 16.0 | 15.4 | n.r. |
| After production | | | |
| Erichsen (mPa · s) | 480 | >500 | >500 |
| Brookfield (mPa · s) | 1440 | >2000 | 1550 |
| d50/d99 (μm) | 1.2/6.0 | 0.7/5.0 | 0.7/5.9 |

The emulsion of Example 9 was safe, while the emulsion of Comparative Example I was unsafe. These Examples show that surfactants of the proper type (an ethoxylated fat alcohol) cannot be used if the HLB value is below 16.0 and that the use of a surfactant is required.

Example 10 and Comparative Example J

An emulsion of 2,4,4-trimethylpentyl-2-peroxyneodecanoate was used in the polymerization of VCM in a 1liter stainless steel Buchi autoclave with 3-bladed stirrer, baffle, and temperature sensor. The polymerization recipe was as follows:

| | |
|---|---|
| VCM | 260 g |
| $H_2O$ | 520 g |
| KP-08 | 0.39 g |
| Peroxyester emulsion | 0.26 g (0.05% w/w of pure peroxide on VCM) |
| $Na_2HPO_4$ | 0.1 g |
| $NaH_2PO_4$ | 0.1 g |

The PVA was dissolved in the water and the phosphate buffer was added. The reactor was evacuated and flushed with $N_2$ four times (at room temperature). While stirring at 735 rpm, VCM was added. Subsequently, the reactor was heated to 53.5° C. in twenty-five minutes. Then, the initiator emulsion was added by injection through a septum. The polymerization was stopped after 480 minutes by venting off unreacted VCM and cooling. The PVC that was formed was filtered, washed with $H_2$) and dried overnight at 30° C. in an air oven and analyzed. The conversion was determined gravimetrically, the mean particle size by means of a Coulter® Counter Multisizer, the bulk density with an Erichsen Din Cup 243/11.8, the dry flow with the same Din Cup, the plasticizer absorption according to DIN 53417 and the fish-eye number as described by O. Leachs in *Kunststoffe*, Band 50(4), 1960, pp. 227–234.

In Example 10 the emulsion of 2,4,4-trimethylpentyl-2-peroxyneodecanoate was the emulsion according to Example 4, while in Comparative Example J, the emulsion was prepared by dispersing 50% w/w of peroxyester and 3% w/w of Unitika UMR10M in 47% w/w of 74/26 water/methanol. The viscosity of the latter emulsion was not according to the invention. The result are presented below:

TABLE 7

| Example | 10 | J |
|---|---|---|
| yield on VCM (%) | 81.2 | 76. |
| fouling | none | some |
| PVC particles >800 µm (g) | 0.12 | 2.85 |
| PVC bulk density (g/l) | 374 | 404 |
| PVC dry flow | 3.02 | 3.36 |
| PVC mean particle size (µm) | 126.7 | 139.0 |
| fish-eye number (approx.) | 50 | 100 |
| DOP absorption (%) | 29.5 | 26 |

These Examples show that the emulsions according to the invention are very suitable for the production of PVC.

What is claimed is:

1. An aqueous emulsion concentrate comprising a peroxyester, wherein said peroxyester is liquid at −20° C., a protective colloid, a non-ionic surfactant, and an anti-freeze agent wherein the protective colloid is a polyvinyl acetate with a degree of hydrolysis between 45% and 68% and the non-ionic surfactant has an HLB value of 16 or higher and is selected from the group consisting of alkylene oxide block-copolymers, ethoxylated fatty alcohols and ethoxylated fatty acids and where the viscosity of the emulsion is less than 500 mPa.s when analyzed with an Erichsen viscometer or less than 2000 mPa.s when analyzed with a Brookfield LVT using spindle sp3 at 12 rpm.

2. An aqueous emulsion according to claim 1 wherein the peroxyester is present in an amount between 45% and 65% by weight.

3. An aqueous emulsion according to any one of claims 1 or 2 wherein the polyvinyl acetate has a degree of hydrolysis between 50% and 60%.

4. An aqueous emulsion according to claim 1 wherein the polyvinyl acetate is present in an amount between 0.5% and 10% by weight.

5. An aqueous emulsion according to claim 1 wherein the surfactant is an ethoxylated fatty alcohol or an ethoxylated fatty acid.

6. An aqueous emulsion according to claim 1 wherein the surfactant is present in an amount from 0.05% to 5% by weight.

7. An aqueous emulsion according to claim 1 wherein the surfactant has an HLB value of 17 or higher.

8. An aqueous emulsion according to claim 1 wherein the anti-freeze is a compound selected from the group consisting of methanol, ethanol, isopropanol, glycol, propanediol, glycerol, and combinations thereof, and is used in a quantity such that the emulsion does not freeze at a temperature of −20° C.

9. An aqueous emulsion according to claim 1 wherein the average droplet size of the peroxyester in the emulsion is less than 20 µm.

10. An aqueous emulsion according to claim 1 wherein the viscosity of the emulsion is less than 300 mPa.s when analyzed with an Erichsen viscometer.

11. An aqueous emulsion according to claim 1 wherein the viscosity of the emulsion is less than 1500 mPa.s when analyzed with a Brookfield LVT and spindle sp3 at 12 rpm.

12. A process for the radical reaction of monomers and/or polymers by combining the monomers and/or polymer with an emulsion according to any one of claims 1–2 and 4–11 with the emulsion serving as the source of free radicals in the reaction of the monomers and/or polymers.

13. A process according to claim 12 wherein the free radicals are used in a polymerization process.

14. A process according to claim 13 wherein vinyl chloride is polymerized, optionally together with other monomers and/or in the presence of a polymer.

* * * * *